(12) United States Patent
Takeda et al.

(10) Patent No.: US 6,857,793 B2
(45) Date of Patent: Feb. 22, 2005

(54) SPLICE MODULE WITH OPTICAL FIBER ALIGNING PASSAGEWAY DETERMINING INSCRIBED CIRCLE OF REDUCED RADIUS

(75) Inventors: Jun Takeda, Tokyo (JP); Yuichi Koreeda, Tokyo (JP)

(73) Assignee: Japan Aviation Electronics Industry, Limited, Tokyo (JP)

(*) Notice: Subject to any disclaimer, the term of this patent is extended or adjusted under 35 U.S.C. 154(b) by 0 days.

(21) Appl. No.: 10/665,553

(22) Filed: Sep. 22, 2003

(65) Prior Publication Data

US 2004/0071408 A1 Apr. 15, 2004

(30) Foreign Application Priority Data

Sep. 27, 2002 (JP) ..................................... 2002/283571

(51) Int. Cl.[7] ............................................. G02B 6/255
(52) U.S. Cl. ...................................................... 385/99
(58) Field of Search .............................. 385/95, 96, 97, 385/98, 99 I

(56) References Cited

U.S. PATENT DOCUMENTS

| | | | | |
|---|---|---|---|---|
| 4,662,962 A | * | 5/1987 | Malavieille | 156/158 |
| 4,919,510 A | * | 4/1990 | Hoke et al. | 385/95 |
| 5,061,034 A | * | 10/1991 | Fujikawa et al. | 385/95 |
| 5,222,171 A | * | 6/1993 | Straus | 385/96 |
| 5,400,426 A | * | 3/1995 | de Jong et al. | 385/95 |
| 6,103,344 A | | 8/2000 | Ota et al. | |

FOREIGN PATENT DOCUMENTS

| | | |
|---|---|---|
| EP | 0405620 | 1/1991 |
| JP | 02264205 | 10/1990 |
| JP | 2001201668 | 7/2001 |
| JP | 200248934 | 2/2002 |
| JP | 2002048934 | 2/2002 |

OTHER PUBLICATIONS

European Search Report, dated Dec. 19, 2003.

* cited by examiner

Primary Examiner—Thanh-Tam Le
(74) Attorney, Agent, or Firm—Baker Botts L.L.P.

(57) ABSTRACT

A splice module for optically interconnecting ends of first and second optical fibers (200, 300), each of which has a predetermined radius ($R_f$). The splice module comprises first and second plates (20, 30), both of which are made of silicon. The first plate 20 is provided with grooves (22). The second plate (30) is arranged on the first plate (20) to cover the grooves (22) and to define passage ways (26) for receiving and aligning the ends of the first and the second optical fibers (200, 300). The passage way (26) has an inscribed circle (28), which has a radius ($R_i$) larger than the predetermined radius ($R_f$) by a predetermined difference (D) between 0.5 μm and 1.0 μm, both inclusive.

7 Claims, 8 Drawing Sheets

SPLICE MODULE WITH OPTICAL FIBER ALIGNING PASSAGEWAY DETERMINING INSCRIBED CIRCLE OF REDUCED RADIUS

This application claims priority to prior Japanese application JP 2002-283571, the disclosure of which is incorporated herein by reference.

BACKGROUND OF THE INVENTION

This invention relates to a splice module for use in optical fiber alignment.

JP-A 2002-48934 discloses a splice module for use in optical fiber alignment. In the splice module, there are a substrate and a presser plate, wherein the substrate is formed with a plurality of grooves, each of which extends in a predetermined direction. The presser plate is arranged on the substrate to define a plurality of passage ways, each of which is for receiving and aligning the ends of optical fibers. In particular, the presser plate is formed with a plurality of guide portions, which are positioned in accordance with the respective grooves to substantially enlarge the opposite ends of each groove. The splice module can provide an insertion ease.

JP-A 2001-201668 discloses another splice module for optical fibers. The splice module has two plates, one of which is formed with a plurality of grooves, while the other is arranged thereon to render the grooves a plurality of passage ways for receiving and aligning optical fibers.

However, there is no consideration as to a suitable relation between passage ways and optical fibers. For example, the splice module according to JP-A 2002-48934 cannot achieve a precise alignment of optical fibers because the sectional area of each passage way is too large to do that. If the passage way has a small cross section, an alignment precision might increase. However, load upon insertion of the optical fibers into the splice module also increase. This means that an unsuitable small cross section of the passage way makes it difficult that the splice module receives a large number of optical fibers.

SUMMARY OF THE INVENTION

It is an object of the present invention to provide a splice module which can achieve a precise alignment of optical fibers with low load upon insertion of the optical fibers thereinto.

This invention is applicable to a splice module for optically interconnecting ends of first and second optical fibers, each of which has a predetermined radius. The splice module comprises a first plate having a surface, in which at least one groove is formed, the groove (22) extending in a predetermined direction, and a second plate having a surface, which is arranged on the surface of the first plate to define a passage way for receiving and aligning the ends of the first and the second optical fibers, wherein the passage way has in a plane perpendicular to the predetermined direction an inscribed circle (28). According to this invention, the inscribed circle has a radius ($R_i$) larger than the predetermined radius ($R_f$) by a predetermined difference (D) of 1.0 μm or less, preferably between 0.5 μm and 1.0 μm, both inclusive.

DESCRIPTION OF PREFERRED EMBODIMENTS

Figure 1:
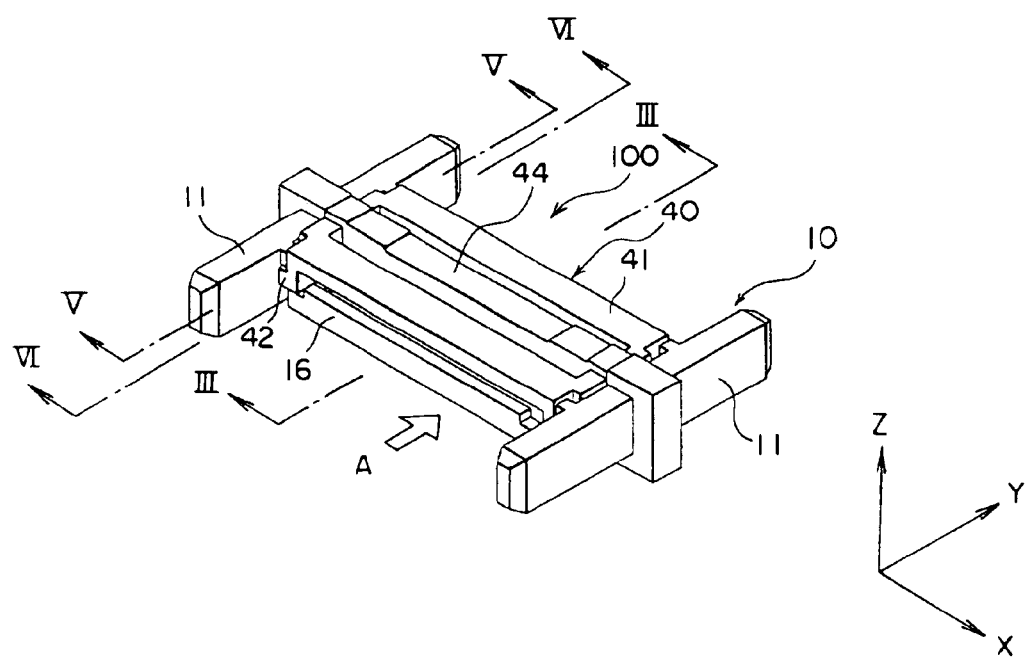
FIG. 1 is a perspective view showing a splice module according to an embodiment of the present invention.
Figure 2:
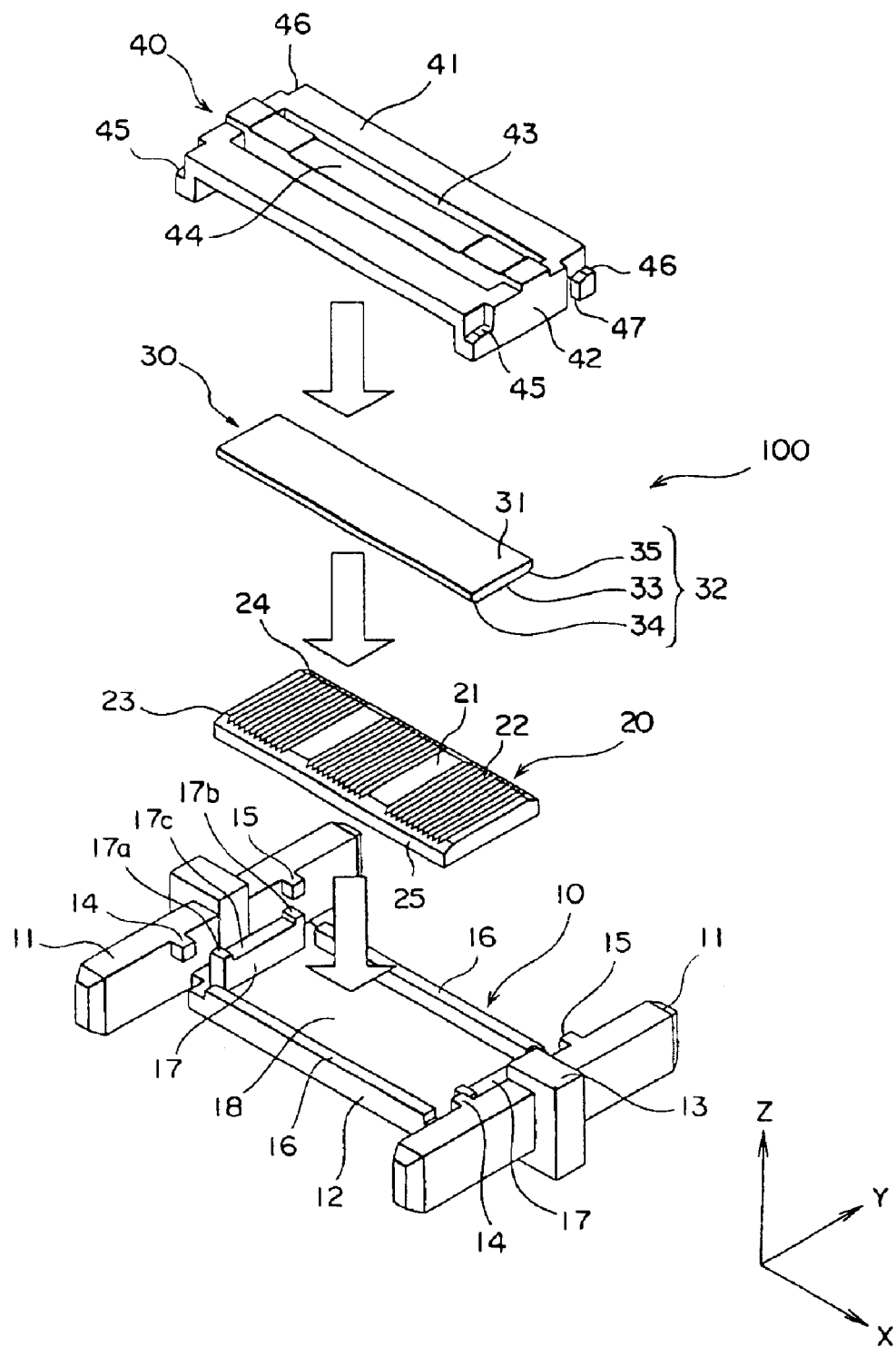
FIG. 2 is an exploded, perspective view showing the splice module of FIG. 1.

With reference to FIGS. 1 and 2, a mechanical splice module 100 for optical fibers in accordance with an embodiment of the present invention comprises a main member 10, first and second plates 20, 30 and a pressing lid 40.

As shown in FIG. 2, the main member 10 comprises a pair of frame portions 11 and a base portion 12. Each of the frame portions 11 extends in a Y-direction and is arranged apart from the other frame portion 11 in an X-direction perpendicular to the Y-direction. The base portion 12 is positioned between the frame portions 11 in the X-direction and connects therebetween.

With reference to FIGS. 2 to 5, each of the frame portions 11 is provided with a stopper portion 13, which is positioned at the middle of the frame portion 11 in the Y-direction and has a cross section larger than the frame portion in a plane perpendicular to the Y-direction. As described in JP-A 2002-48934, the splice module 100 of the type is used together with a pair of plug connectors, each of which holds a plurality of optical fibers. The one ends of the frame portions 11 are inserted into the plug connector until the stopper portions 13 bump against an interface portion of the plug connector. The other plug connector also receives the other ends of the frame portions 11 until stopper portions 13 bump against an interface portion of the other plug connector. Thus, when the optical fibers are inserted into the splice module to be spliced to each other, the plug connectors are arranged symmetrically with respect to the stopper portions 13.

Figure 4:
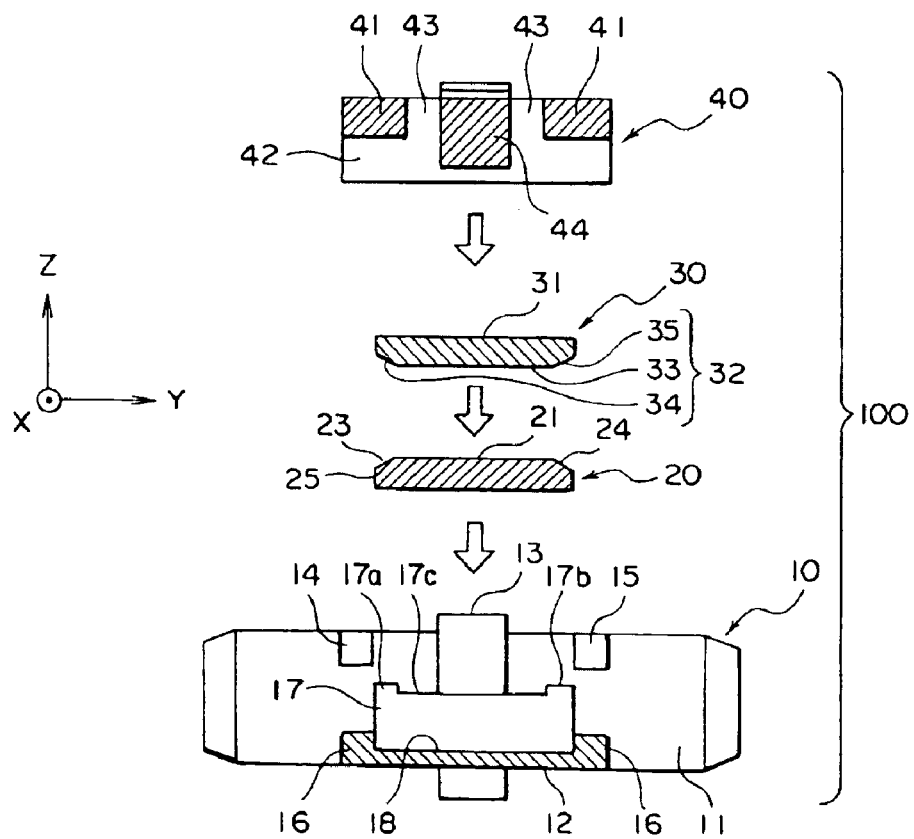
FIG. 4 is an exploded, cross-sectional view showing the splice module of FIG. 3.

As shown in FIGS. 2 and 4, the frame portion 11 is provided with a pair of projections 14, 15. The projection 14 is positioned apart from the other projection 15 in the Y-direction so that the corresponding stopper portion 13 is positioned between the projections 14, 15. The projections 14, 15 project in the X-direction towards the corresponding projections 14, 15 of the other frame portion 11.

Figure 6:
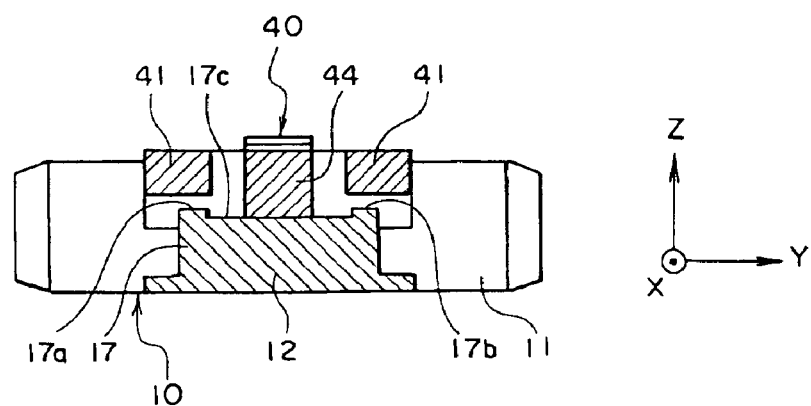
FIG. 6 is a cross-sectional view of the splice module, taken along lines VI—VI of FIG. 1.

As shown in FIG. 2, the base portion 12 is provided with a pair of rail portions 16 and a pair of standing-up portions 17. The rail portions 16 are positioned at the respective ends of the base portion 12 in the Y-direction. Each of the rail portions 16 extends in the X-direction and projects from the base portion 12 upwards in a Z-direction perpendicular to the X- and the Y-directions. The standing-up portions 17 are positioned near to other ends of the base portion 12 in the X-direction with certain distances left between the standing-up portions 17 and the respective ends of the base portion 12 in the X-direction. The standing-up portions 17 project from the base portion 12 upwards in the Z-direction. The rail portions 16 and the standing-up portions 17 define on the base portion 12 a mounting portion 18 for receiving the first plate 20. As shown in FIGS. 2, 4 and 6, each of the standing-up portions 17 is comprises of three parts 17a–17c, wherein the middle part 17b is slightly shorter than the end parts 17a, 17c so that the middle part 17b constitutes a depressed portion.

Figure 3:
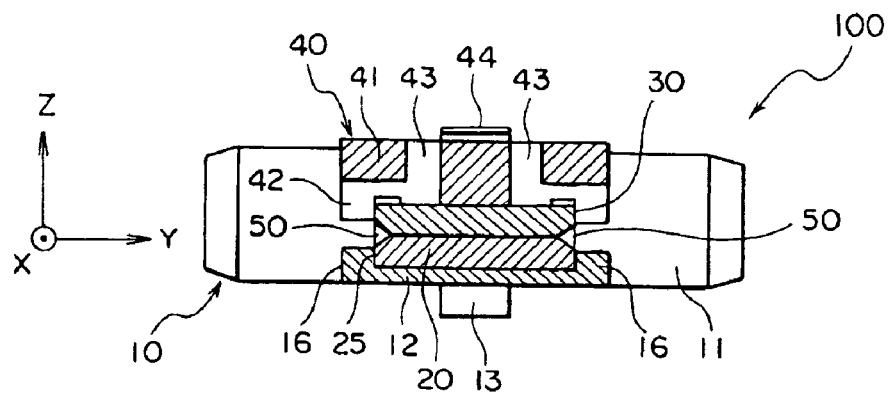
FIG. 3 is a cross-sectional view of the splice module, taken along lines III—III of FIG. 1.

As shown in FIGS. 2 and 3, the first plate 20 is an almost rectangular plate and is sized to be accommodated and fitted within the mounting portion 18. The first plate 20 is made of silicon but may be made of another material which is harder than silicon. The first plate 20 has an upper surface 21 and a lower surface which is mounted on the mounting portion 18. In the upper surface 21, a plurality of grooves 22 are formed. The grooves 22 are arranged in the X-direction. Each of the grooves 22 extends in the Y-direction and has a V-shaped cross-section in a plane perpendicular to the Y-direction, i.e. in the XZ plane. The first plate 20 has beveled edges 23, 24 which continue to the respective ends of the grooves 22. As shown in FIGS. 2 to 4, each of vertically-extending sides 25 of the first plate 20 is sized such that the rail portions 16 do not hide the grooves 22 when the grooves 22 are seen from the Y-direction. In other words, the rail portions 16 of the main member 10 are lower than the vertically-extending sides 25 of the first plate 20.

Figure 7:
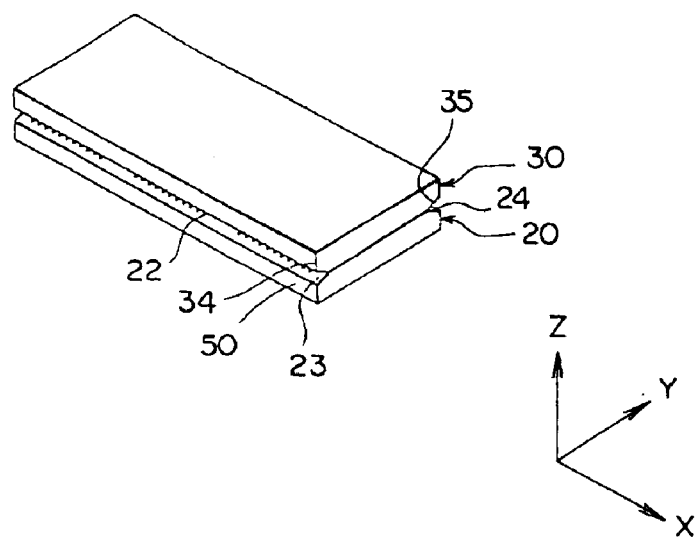
FIG. 7 is a perspective view showing a combination of first and second plates, which are included in the splice module of FIG. 1.

With reference to FIGS. 2 to 4, the second plate 30 is also an almost rectangular plate and is sized to correspond to the first plate 20. The second plate 30 is also made of silicon but may be made of another material which is harder than silicon. The second plate 30 has upper and lower surfaces 31, 32. The lower surface 32 of the second plate 30 has a horizontal plane portion 33 and beveled edges 34, 35. The beveled edges 34, 35 extend in the X-direction. As shown in FIGS. 3 and 7, the beveled edges 34, 35 define insertion guides 50 of the optical fibers in cooperation with the beveled edges 23, 24 when the second plate 30 is arranged on the first plate 20.

In this embodiment, the second plate 30 has a particular height such that the upper surface 31 is arranged on the same level as the middle part 17c of the standing-up portion 17 when the second plate 30 is mounted on the main member 10 together with the first plate 20, as seen from FIGS. 3, 4 and 6. In other words, a total height of the first and the second plates 20, 30 in the Z-direction is equal to the height of the middle part 17c of the standing-up portion 17.

As shown in FIGS. 1 to 6, the pressing lid 40 has a top plate portion 41 and a pair of sidewall portions 42, which are provided for the top plate portion 41. The sidewall portions 42 are formed at the opposite edges of the top plate portion 41 in the X-direction and project downwardly in the Z-direction so that the pressing lid 40 has a C-shaped cross section in the XZ plane. The pressing lid 40 has a size in the X-direction such that the pressing lid 40 is fitted to the inner surfaces of the frame portions 11 of the main member 10 when the pressing lid 40 is combined with the main member 10. The sidewall portion 42 has a thickness in the X-direction such that the sidewall portion 42 can enter between the inner surface of the corresponding frame portion 11 and the corresponding standing-up portion 17.

The top plate portion 41 has an opening 43 and is provided with a beam portion 44, which extends over the opening 43 in the X-direction. The beam portion 44 has a thickness thicker than the top plate portion 41 in the Z-direction so that the beam portion 44 projects downwardly beyond the top plate portion 41 in the Z-direction. The beam portion 44 sits on the middle parts 17c of the standing-up portions 17 and fixes the first and the second plates 20, 30 in the combined state, as shown in FIG. 6.

Each of the sidewall portions 42 is provided with recesses 45, 46. The recesses 45, 46 are formed in the outside surface of the sidewall portion 42, as seen from FIG. 2. The recess 45 communicates with the front side of the sidewall 42 and the upper surface of the top plate portion 41, as shown in FIG. 2. The recess 46 communicates with the rear side of the sidewall 42 and the upper surface of the top plate portion 41. The sidewall portion 42 is also provided with a vertical recess 47, with which the recess 46 also communicates.

Figure 5:
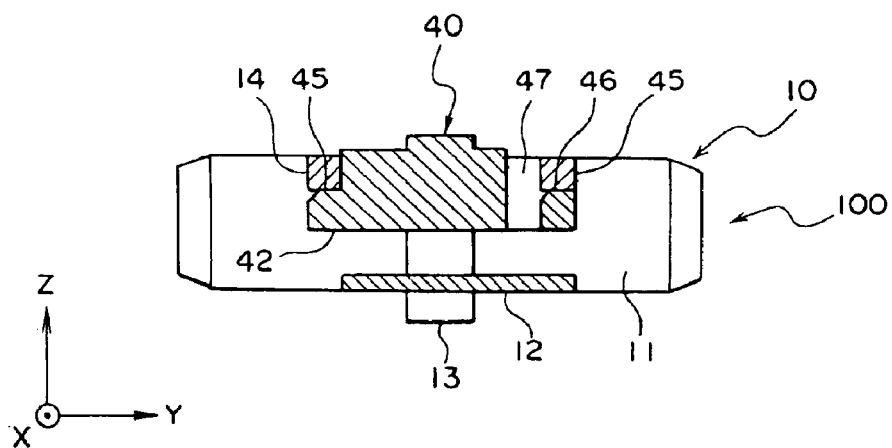
FIG. 5 is a cross-sectional view of the splice module, taken along lines V—V of FIG. 1.

After the first and the second plates 20, 30 are mounted on the mounting portion 18, the pressing lid 40 is arranged so that the frond end of the pressing lid 40 corresponds to the rear surfaces of the projections 14, while the vertical recesses 47 accommodate the other projections 15. When the pressing lid 40 is pressed down and is moved forwards in the Y-direction, the projections 14, 15 are engaged and fitted with the recesses 45, 46, respectively, as shown in FIG. 5. At that time, the first and the second plates 20, 30 are caught and fixed between the main member 10 and the pressing lid 40, as shown in FIG. 3. As seen from the FIGS. 1, 2 and 5, the main member 10, the first and the second plates 20, 30 and the pressing lid 40 are detachably assembled into the splice module 100. Therefore, the splice module 100 can be disassembled and the grooves 22 can be cleaned.

Figure 8:
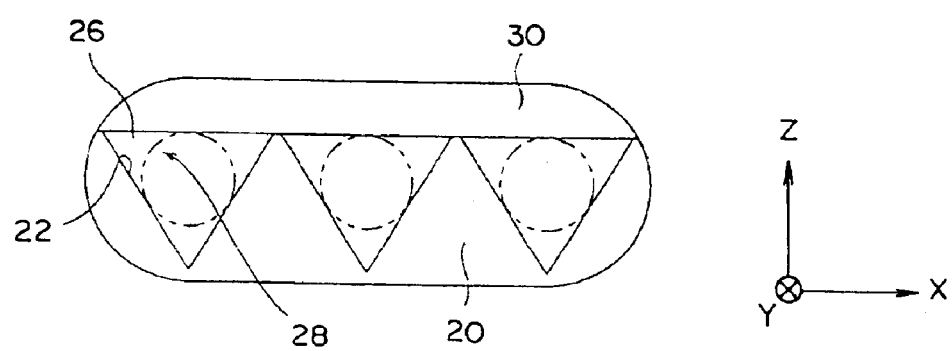
FIG. 8 is an enlarged view on arrow A of FIG. 1 and shows inscribed circles of passage ways for optical fibers.
Figure 9:
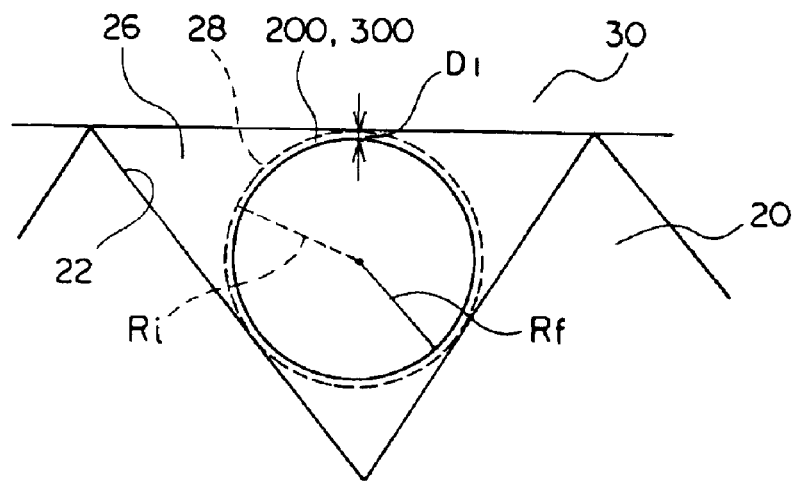
FIG. 9 is a view showing a relation between the passage way and the optical fiber.

As shown in FIGS. 7 to 9, in the state where the second plate 30 is arranged on the first plate 20, the grooves are covered by the second plate 30, and there are defined a plurality of passage ways 26 for receiving and aligning the ends of the optical fibers. Each of the passage ways 26 extends in the Y-direction and has a closed cross-section in the XZ plane. In this embodiment, the cross-section of the passage way 26 is a triangle which has an inscribed circle of a radius Ri. Because the optical fiber 200, 300 has a radius Rf, there is a difference D between the radius Ri and the radius Rf. The difference D is an important parameter for achieving the object of the present invention and belongs to a predetermined range between 0.5 $\mu$m and 1.0 $\mu$m, both inclusive. If the difference D falls within the predetermined range, the force $F_1$ for inserting the optical fiber into the passage way 26 does not exceed 0.1 N. Therefore, the splice module 100 has a superior insertion ease. In addition, since the difference D is not larger than 1.0 $\mu$m, the splice module 100 has an excellent positioning accuracy for the optical fibers.

Silicon is a preferable material for the first and the second plates 20, 30 as explained in the above embodiment, because the hardness of silicon is not so smaller than that of an optical fiber's material and it is easy to form the precise grooves 22 on the first plate 20. In this embodiment, the forming of the grooves 22 is carried out in an etching process. Zirconia or alumina is also used as a material of the first and the second plates 20, 30 in view of its hardness.

Figure 10:
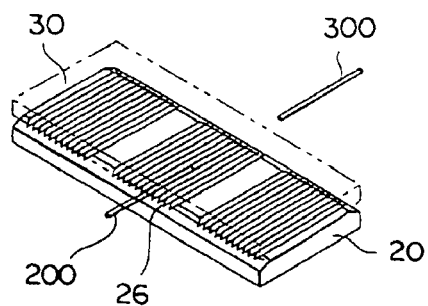
FIG. 10 is a view used for an explanation of a measurement of a force upon inserting of optical fibers into the splice module in accordance with the embodiment of the present invention.
Figure 11:
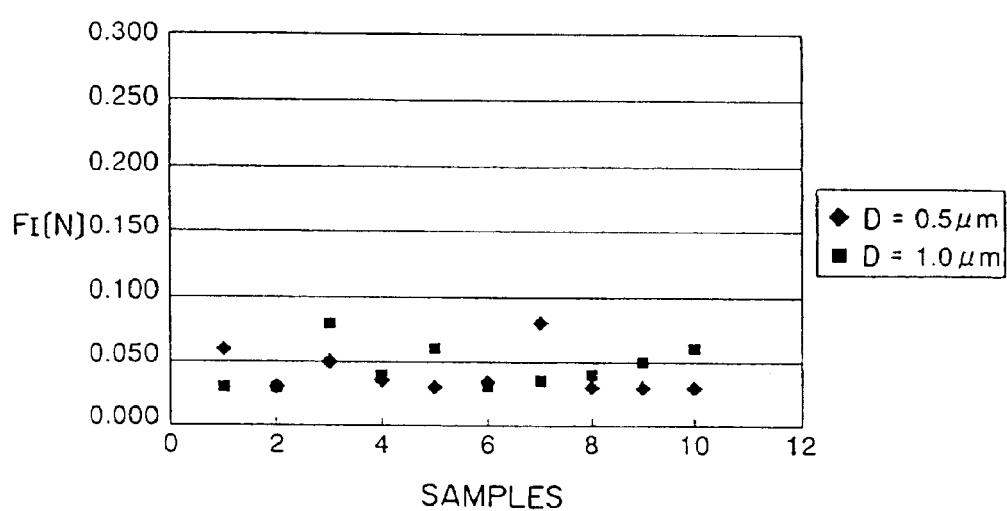
FIG. 11 is a result in accordance with the measurement of FIG. 10.
Figure 12:
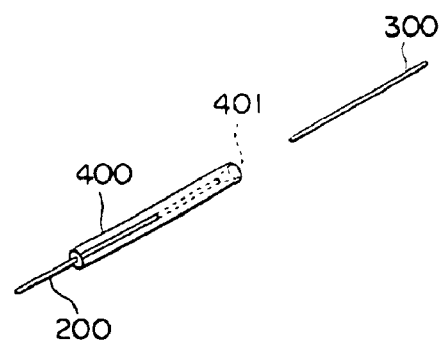
FIG. 12 is a view used for an explanation of a measurement of a force upon inserting optical fibers into a glass tube as a comparative example.
Figure 13:
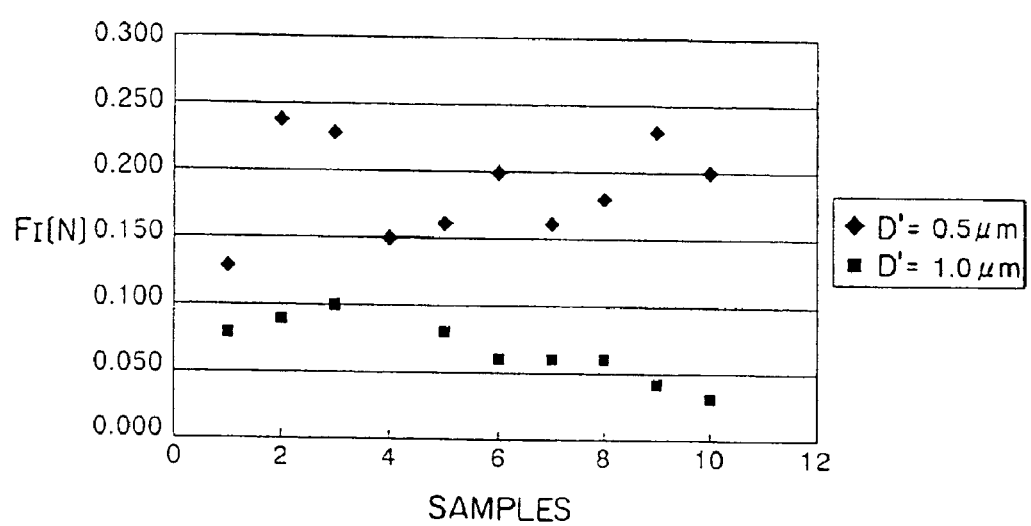
FIG. 13 is a result in accordance with the measurement of FIG. 12.

Now, the effect of the splice module of the present embodiment will be explained with reference to FIGS. 10 to 13. As shown in FIGS. 10 and 12, pairs of optical fibers 200, 300 were inserted into the passage way 26 and a hole 401 of a glass tube 400, respectively, and the insertion forces $F_1$ upon the insertions were measured. FIGS. 11 and 13 show the results according to measurements of FIGS. 10 and 12, respectively. In FIGS. 11 and 13, an insertion force $F_1$ is an ordinate of the graph while the number of samples is an abscissa of the graph.

In FIG. 11, each of black rhombuses represents the insertion force $F_1$, which was required under the condition where the difference D between the optical fiber 200, 300 and the inscribed circle 28 is 0.5 μm (also see FIG. 9). Each of the black squares represents the insertion force $F_1$ which was required in case of the difference D of 1 μm. In either case where the difference D was 0.5 or 1 μm, it became clear that the optical fiber 200, 300 could be inserted into the groove with the force not larger than 0.1 N.

On the other hand, the insertion force $F_1$ was required to be 0.2 N in the case of the difference D of 0.5 μm. For the low insertion force $F_1$, which was not larger than 0.1 N, the difference D of 1 μm was required at the minimum in accordance with the glass tube 400 for splicing two optical fibers 200, 300.

What is claimed is:

1. A splice module for optically interconnecting ends of first and second optical fibers, each of which has a predetermined radius, the splice module comprising:

a first plate having a surface, in which at least one groove is formed, the groove extending in a predetermined direction;

a second plate having a surface, which is arranged on the surface of the first plate to define a passage way for receiving and aligning the ends of the first and the second optical fibers, wherein the passage way has in a plane perpendicular to the predetermined direction an inscribed circle, said inscribed circle having a radius larger than the predetermined radius by a predetermined difference of 1.0 μm or less; and a main member and a pressing lid, wherein: the main member has a mounting portion for mounting the first plate and projections: the pressing lid is formed with recesses; which engage with and are fitted with the projections while the first and the second plates are caught and fixed between the main member and the pressing lid;

wherein:

the main member comprises a pair of frame portions and a base portion;

each of the frame portions extends in a first direction as the predetermined direction and is arranged apart from the other frame portion in a second direction perpendicular to the first direction, wherein the projections are provided for the frame portions and project between the frame portions;

the base portion connects between the frame portions in the second direction and is provided with the mounting portion;

the pressing lid has a top plate portion and sidewall portions;

the top plate portion has opposite ends in the second direction; and the sidewall portions project from the opposite ends of the top plate portion towards the base portion in a third direction perpendicular to the first and the second directions, wherein the sidewalls have outside surfaces, respectively, and the recesses are formed in the outside surfaces of the sidewalls;

wherein the outside surfaces of the sidewalls are in contact with the respective frame portions while the projections engage with the recesses; and wherein:

the top plate portion is formed with an opening and is provided with a beam portion;

the beam portion extends over the opening in the second direction and projects beyond the top plate portion towards the base portion in the third direction;

the base portion is formed with two standing-up portions, which are arranged away from each other in the second direction and project from the base portion towards the top plate portion in the third direction, wherein the standing-up portions are brought into contact with the beam portion while the first and the second plates are placed and fixed between the beam portion and the base portion.

2. The splice module according to claim 1, wherein the predetermined difference is a size between 0.5 μm and 1.0 μm, both inclusive.

3. The splice module according to claim 1, wherein the groove has a V-shaped cross section.

4. The splice module according to claim 1, wherein the passage way has a closed cross section in the plane perpendicular to the predetermined direction.

5. The splice module according to claim 1, wherein the first and the second plates have particular hardness equal to or higher than that of silicon.

6. The splice module according to claim 5, wherein the first and the second plates are made of silicon.

7. The splice module according to claim 1, wherein the groove has a cross-sectional shape obtainable by an etching process.

* * * * *